United States Patent
Hamdoon et al.

(10) Patent No.: US 11,840,198 B2
(45) Date of Patent: Dec. 12, 2023

(54) VEHICLE DOOR TRIM PANEL

(71) Applicant: Ford Global Technologies, LLC, Dearborn, MI (US)

(72) Inventors: Muhsin M. Hamdoon, Windsor (CA); Marwan A. Elbkaily, Canton, MI (US); Marc D. Nedelman, Waterford, MI (US); Robin Burnett, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/717,276

(22) Filed: Apr. 11, 2022

(65) Prior Publication Data

US 2023/0322161 A1 Oct. 12, 2023

(51) Int. Cl.
| | |
|---|---|
| *B60R 7/04* | (2006.01) |
| *B60R 13/02* | (2006.01) |
| *B60R 21/04* | (2006.01) |
| *B60R 21/00* | (2006.01) |

(52) U.S. Cl.
CPC .......... *B60R 7/046* (2013.01); *B60R 13/0243* (2013.01); *B60R 21/0428* (2013.01); *B60R 2021/0055* (2013.01)

(58) Field of Classification Search
CPC . B60R 7/046; B60R 13/0243; B60R 21/0428; B60R 2021/0055
USPC ......................................... 296/187.05, 146.7
See application file for complete search history.

(56) References Cited

U.S. PATENT DOCUMENTS

| | | | |
|---|---|---|---|
| 6,851,740 B1 | 2/2005 | Peng | |
| 7,237,825 B1 * | 7/2007 | Tilli | B60J 5/0416 |
| | | | 296/187.05 |
| 9,085,221 B2 | 7/2015 | Rehman et al. | |
| 9,114,839 B2 * | 8/2015 | Langenbacher | B60N 2/78 |
| 9,193,310 B2 * | 11/2015 | Hinokio | B60R 13/0243 |
| 9,259,995 B2 * | 2/2016 | Steinbrecher | B60R 13/0243 |
| 9,266,489 B2 * | 2/2016 | Smith | B60R 13/0243 |
| 9,446,723 B2 * | 9/2016 | Stepanski | B29C 43/145 |
| 9,517,727 B2 * | 12/2016 | Tiboni | B60R 7/046 |
| 9,517,742 B2 * | 12/2016 | Guiard | F16F 7/12 |
| 9,956,855 B2 * | 5/2018 | Tamaoki | B60J 5/0416 |
| 10,000,112 B2 | 6/2018 | Patel et al. | |
| 10,246,023 B2 | 4/2019 | Gutierrez Guzman et al. | |
| 10,427,623 B2 | 10/2019 | Siqueira et al. | |
| 2021/0237542 A1 | 8/2021 | Curtis et al. | |

FOREIGN PATENT DOCUMENTS

| | | |
|---|---|---|
| CN | 207374077 U | 5/2018 |
| CN | 208867956 U | 5/2019 |
| CN | 111216642 A | 6/2020 |

* cited by examiner

*Primary Examiner* — Jason S Morrow
(74) *Attorney, Agent, or Firm* — Vichit Chea; Price Heneveld LLP

(57) ABSTRACT

A vehicle door trim panel has a vehicle interior-facing A-side and a vehicle door structure-facing B-side. The vehicle door trim panel includes a pocket portion that includes a side portion and a wall portion that surrounds and extends outward from the pocket portion. The wall portion has a first portion. The B-side of the first portion of the wall portion is concave and faces generally vehicle-downward. A thickness of the first portion of the wall portion is less than a thickness of the pocket portion adjacent to the first portion of the wall portion.

20 Claims, 5 Drawing Sheets

VEHICLE DOOR TRIM PANEL

FIELD OF THE DISCLOSURE

The present invention generally relates to a vehicle door trim panel and, more specifically, to a vehicle door trim panel with a pocket portion.

BACKGROUND OF THE DISCLOSURE

Vehicle side doors include trim panels.

SUMMARY OF THE DISCLOSURE

According to one aspect of the present invention, a vehicle door trim panel has a vehicle interior-facing A-side and a vehicle door structure-facing B-side. The vehicle door trim panel includes a pocket portion that includes a side portion and a wall portion that surrounds and extends outward from the pocket portion. The wall portion has a first portion. The B-side of the first portion of the wall portion is concave and faces generally vehicle-downward. Further, a thickness of the first portion of the wall portion is less than a thickness of the pocket portion adjacent to the first portion of the wall portion.

Embodiments of the first aspect of the invention can include any one or a combination of the following features:
- the thickness of the first portion of the wall portion is less than 2 mm;
- the thickness of the side portion adjacent to the first portion of the wall portion is greater than 2 mm;
- the thickness of the first portion of the wall portion is about 1.75 mm;
- the thickness of the side portion adjacent to the first portion of the wall portion is about 2.25 mm;
- a protrusion that extends outward from the B-side of the side portion, wherein at least a portion of the protrusion is at least one of vehicle-elevationally aligned with and vehicle-elevationally lower than at least a portion of the first portion of the wall portion;
- the protrusion includes a central protuberance, and a plurality of fins extending radially outward from the central protuberance;
- at least a portion of the B-side of the first portion of the wall portion is partially-cylindrical;
- the wall portion extends from a proximal perimeter, that is adjacent to the side portion, to a distal perimeter, that is distal from the side portion, wherein at least a portion of the wall portion slopes outward from the proximal perimeter to the distal perimeter, such that the distal perimeter is larger than the proximal perimeter;
- the first portion of the wall portion slopes outward from the proximal perimeter to the distal perimeter;
- the first portion slopes outward from the proximal perimeter to the distal perimeter at an angle between about 25 degrees and about 45 degrees relative to a substantially planar portion of the B-side of the side portion, wherein the substantially planar portion of the B-side of the side portion comprises a majority of the B-side of the side portion;
- the first portion slopes outward from the proximal perimeter to the distal perimeter at an angle of about 35 degrees relative to the substantially planar portion of the B-side of the side portion; and
- the A-side of the pocket portion defines a storage pocket for receiving items therein.

According to a second aspect of the present invention, a vehicle door trim panel has a vehicle interior-facing A-side and a vehicle door structure-facing B-side. The vehicle door trim panel includes a pocket portion that includes a side portion and a wall portion that surrounds and extends outward from the pocket portion. The wall portion has a first portion. The B-side of the first portion of the wall portion is concave and faces generally vehicle-downward. The vehicle door trim panel further includes a protrusion that extends outward from the B-side of the side portion. The protrusion is positioned vehicle-forward of the first portion of the wall portion, and at least a portion of the protrusion is at least one of vehicle-elevationally aligned with at least a portion of the first portion of the wall portion and vehicle-elevationally lower than at least a portion of the first portion of the wall portion.

Embodiments of the second aspect of the invention can include any one or a combination of the following features:
- the protrusion includes a central protuberance, and a plurality of fins extending radially outward from the central protuberance;
- a thickness of the first portion of the wall portion is less than a thickness of the pocket portion adjacent to the first portion of the wall portion; and
- the A-side of the pocket portion defines a storage pocket for receiving items therein.

According to a third aspect of the present invention, a vehicle door trim panel has a vehicle interior-facing A-side and a vehicle door structure-facing B-side. The vehicle door trim panel includes a pocket portion that includes a side portion and a wall portion that surrounds and extends outward from the pocket portion. The wall portion has a first portion. The B-side of the first portion of the wall portion is concave and faces generally vehicle-downward. The wall portion also has a second portion that is adjacent to and positioned vehicle-rearward of the first portion and a third portion that is adjacent to and extends vehicle-forward and vehicle-upward from the second portion.

Embodiments of the third aspect of the invention can include any one or a combination of the following features:
- thicknesses of the first, second, and third portions of the wall portion are less than a thickness of the pocket portion adjacent to the first, second, and third portions of the wall portion; and
- the B-side of the third portion is substantially planar and the surface area of the B-side of the third portion is greater than the surface area of the concave B-side of the first portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
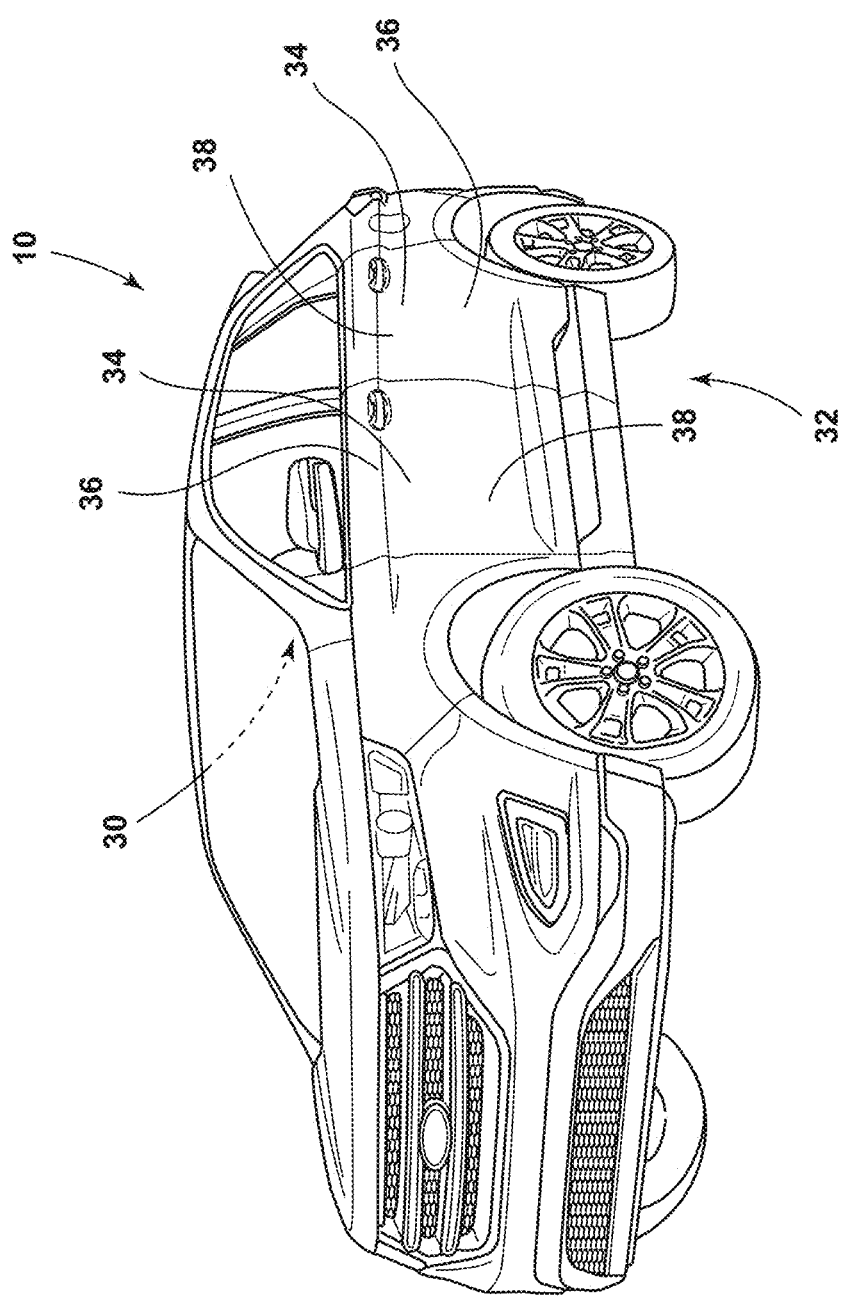
FIG. 1 is a top perspective view of a vehicle, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, a vehicle 10 includes a door trim panel 12. The door trim panel 12 includes a vehicle interior-facing A-side 14 and a vehicle door structure-facing B-side 16. The door trim panel 12 includes a pocket portion 18. The pocket portion 18 includes a side portion 20 and a wall portion 22 that surrounds and extends outward from the side portion 20. The wall portion 22 includes a first portion 24. The B-side 16 of the first portion 24 of the wall portion 22 is concave and faces generally vehicle-downward. The wall portion 22 further includes a second portion 26 that is adjacent to and positioned vehicle-rearward of the first portion 24. The wall portion 22 further includes a third portion 28 that is adjacent to and extends vehicle-forward and vehicle-upward from the second portion 26.

Figure 2:
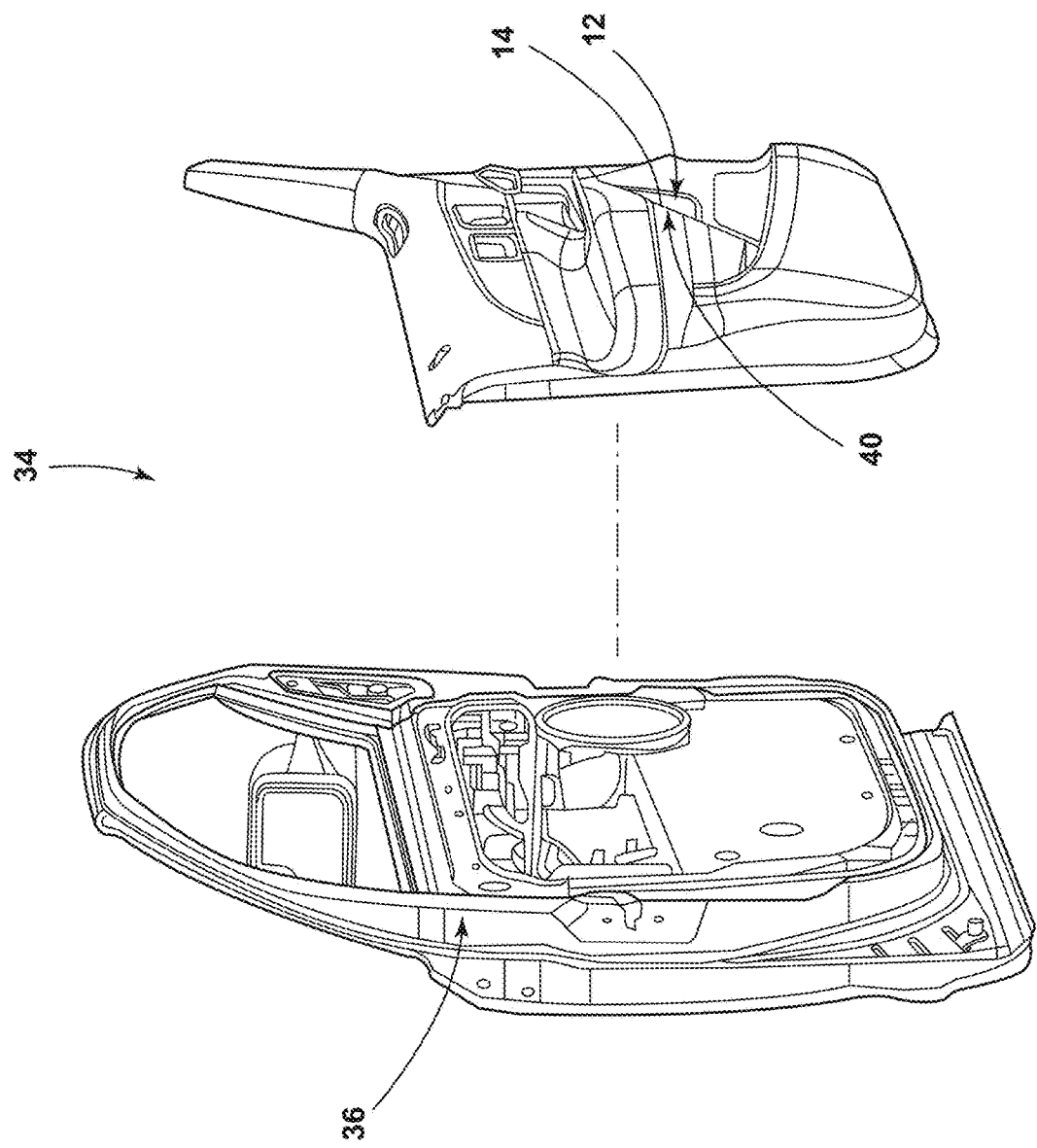
FIG. 2 is an exploded view of a door of a vehicle, illustrating a door structure and a door trim panel configured to be coupled to the door structure, according to one embodiment.

Referring now to FIGS. 1 and 2, the vehicle 10 includes a vehicle interior 30. The vehicle 10 separates the vehicle interior 30 from an exterior environment 32 of the vehicle 10, as illustrated in FIG. 1. As illustrated in FIGS. 1 and 2, the door 34 can be a side door of the vehicle 10, such as a driver-side door of the vehicle 10. The door 34 of the vehicle 10 can include the door structure 36. At least a portion of the door structure 36 can be in fluid communication with the exterior environment 32 of the vehicle 10 in the closed position of the door 34. For example, in the embodiments illustrated in FIGS. 1 and 2, the door structure 36 includes the exterior side 38 of the door 34 that faces away from the vehicle interior 30 and is in fluid communication with the exterior environment 32 of the vehicle 10. It is contemplated that the door structure 36 can include a variety of components, in various embodiments. The door 34 further includes the door trim panel 12. In various embodiments, the door 34 of the vehicle 10 can include a plurality of door trim panels 12. The door trim panel 12 is configured to be coupled to the door structure 36 of the door 34, as illustrated in FIG. 2. In various embodiments, the door trim panel 12 includes an A-side 14, which faces and/or is in fluid communication with the vehicle interior 30 of the vehicle 10, and a B-side 16 that is opposite the A-side 14. The B-side 16 generally faces the door structure 36 and is positioned between the door structure 36 and the A-side 14 of the door trim panel 12.

Figure 3:
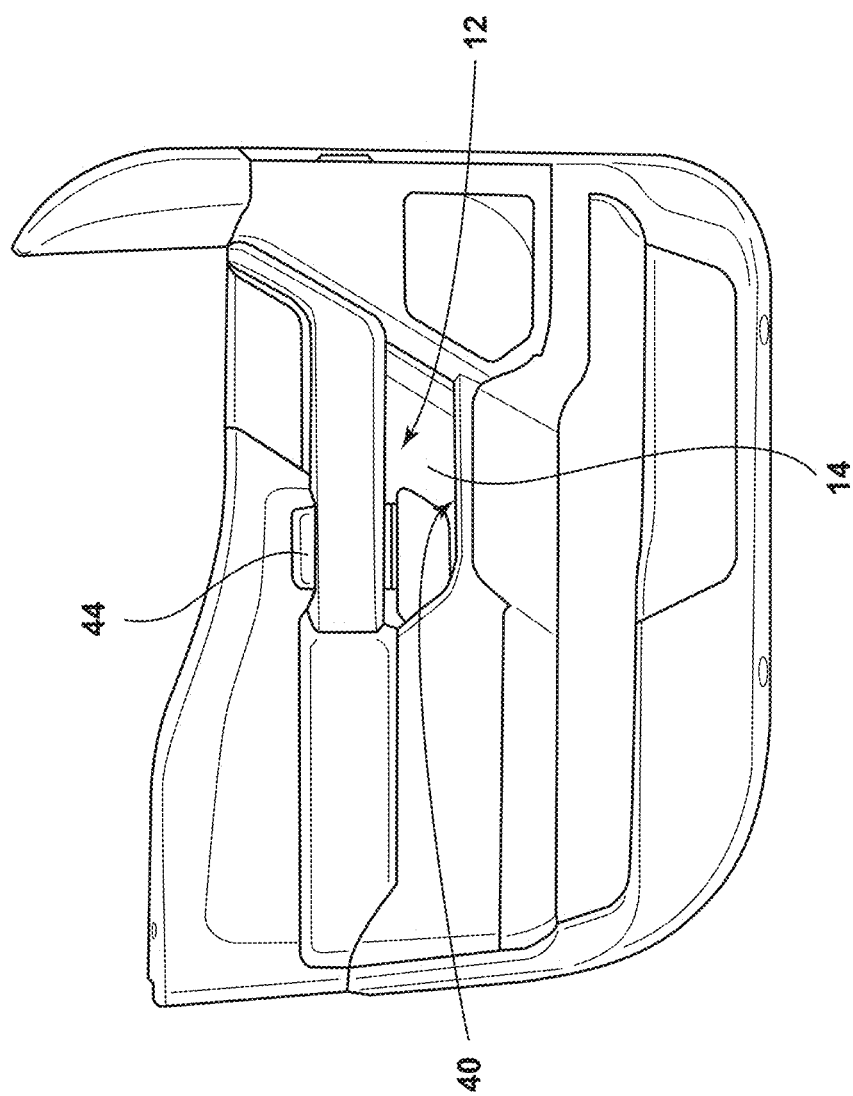
FIG. 3 is a side elevational view of a door trim panel of a door, illustrating a vehicle interior-facing A-side of the door trim panel, according to one embodiment.
Figure 4:
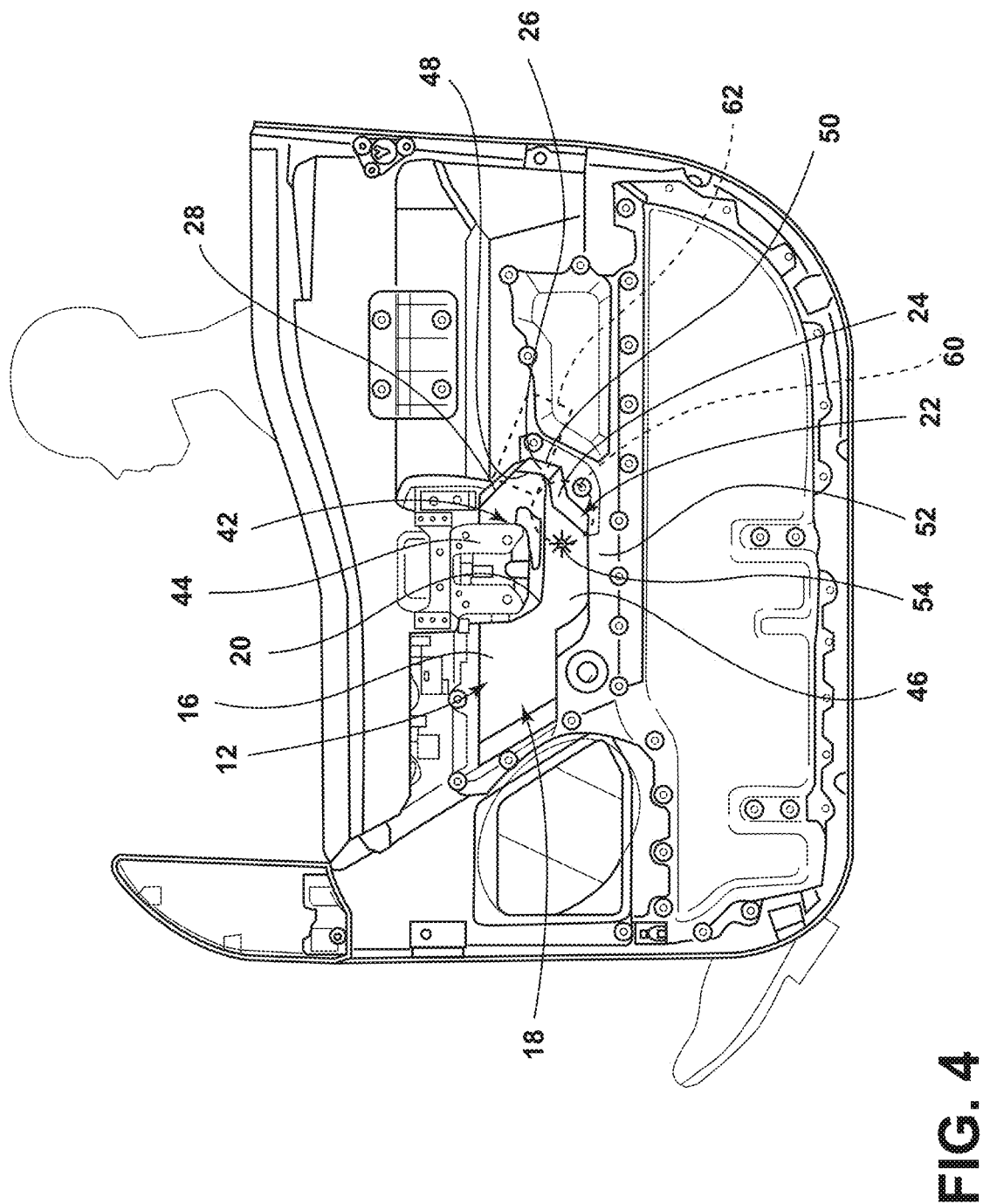
FIG. 4 is a side elevational view of a door trim panel of a door, illustrating a door structure-facing B-side of the door trim panel, according to one embodiment.
Figure 5:
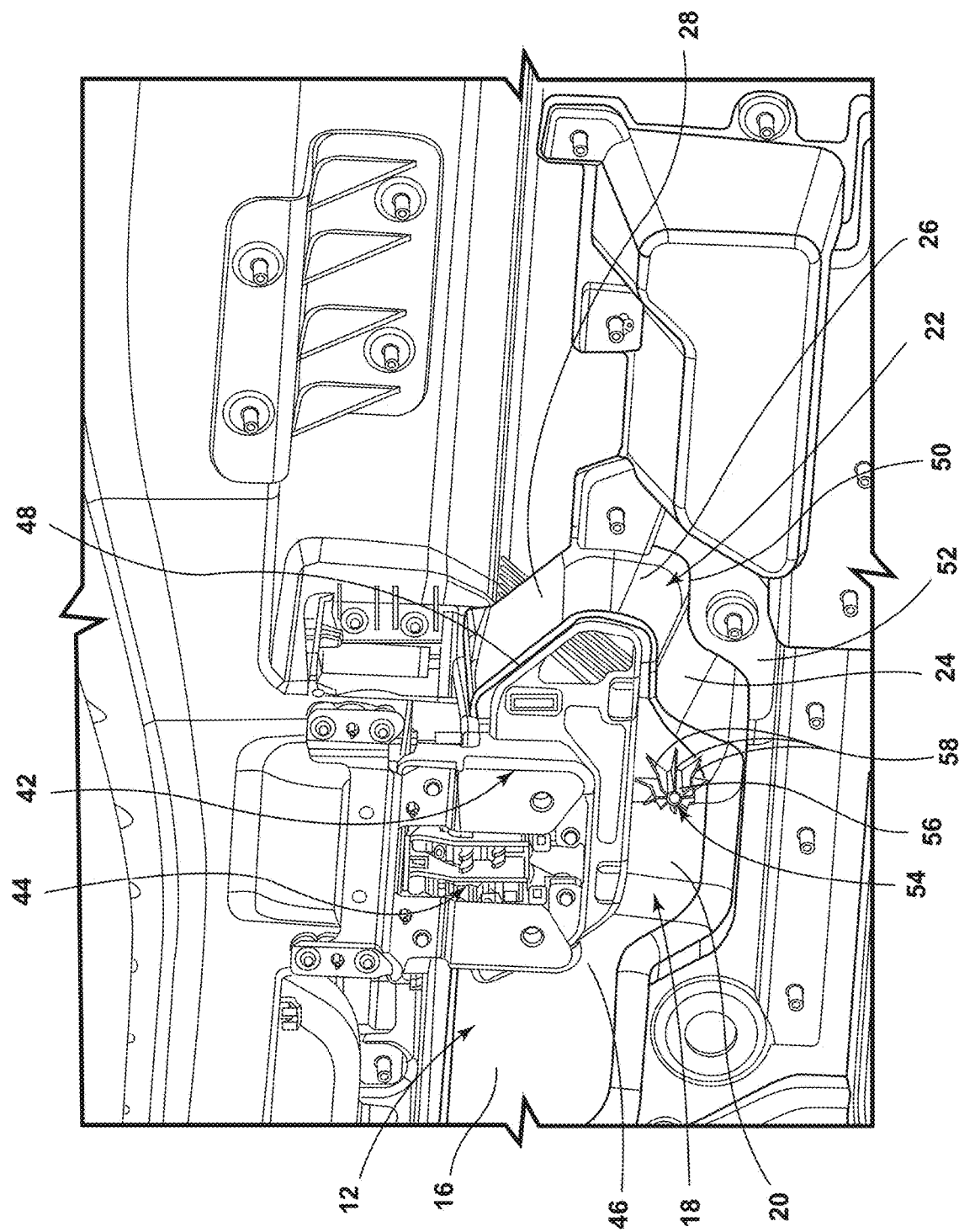
FIG. 5 is a side perspective view of a B-side of a door trim panel, illustrating a pocket portion of the door trim panel, according to one embodiment.

Referring now to FIGS. 3-5, the door trim panel 12 may include the pocket portion 18. In various embodiments, the A-side 14 of the pocket portion 18 of the door trim panel 12 defines a storage pocket 40 for receiving items therein. For example, in various embodiments, the A-side 14 of the pocket portion 18 may define a map pocket of the door 34. The pocket portion 18 includes the side portion 20 and the wall portion 22. As illustrated in FIG. 5, the side portion 20 of the pocket portion 18 can define a receiving space 42 for receiving an interior door handle assembly 44 that is coupled to the door 34. As illustrated in FIGS. 4 and 5, the side portion 20 includes a substantially planar portion 46. The substantially planar portion 46 of the B-side 16 of the side portion 20 can form a majority of the B-side 16 of the side portion 20, as illustrated in FIG. 4.

Referring still to FIGS. 3-5, the wall portion 22 of the pocket portion 18 extends outward from the pocket portion 18. As illustrated in FIG. 5, the wall portion 22 extends from a proximal perimeter 48, that is adjacent to the side portion 20, to a distal perimeter 50, that is distal from the side portion 20. In various embodiments, the distal perimeter 50 of the wall portion 22 is adjacent to a body portion 52 of the door trim panel 12 that extends outward away from the distal perimeter 50 of the pocket portion 18. As described further herein, at least a portion of the wall portion 22 slopes outward from the proximal perimeter 48 to the distal perimeter 50, such that the distal perimeter 50 is larger than the proximal perimeter 48. In other words, a length of the distal perimeter 50 is greater than a length of the proximal perimeter 48.

Referring now to FIGS. 4 and 5, in various embodiments, the wall portion 22 includes a first portion 24. The B-side 16 of the first portion 24 of the wall portion 22 may be concave. As illustrated in FIG. 5, the B-side 16 of the first portion 24 of the wall portion 22 is concave and faces generally vehicle-downward. In some implementations, at least a portion of the B-side 16 of the first portion 24 of the wall portion 22 is at least partially-cylindrical. In other words, the B-side 16 of the first portion 24 of the wall portion 22 may have the shape of a longitudinal portion of a cylinder (e.g., a half of a cylinder, a quarter of a cylinder, etc.).

Referring still to FIGS. 4 and 5, the wall portion 22 may include the second portion 26. The second portion 26 may be adjacent to the first portion 24 and positioned vehicle-rearward of the first portion 24. For example, as illustrated in FIGS. 4 and 5, the second portion 26 of the wall portion 22 extends generally vehicle-rearward and vehicle-upward from the first portion 24 of the wall portion 22. The wall portion 22 may further include the third portion 28. The third portion 28 may be adjacent to the second portion 26. In various embodiments, the second portion 26 is adjacent to both the first and third portions 24, 28 and is positioned between the first and third portions 24, 28 of the wall portion 22. The third portion 28 may extend vehicle-forward and vehicle-upward from the second portion 26. In the embodiment illustrated in FIG. 5, the B-side 16 of the third portion 28 of the wall portion 22 is substantially planar. In some embodiments, the surface area of the B-side 16 of the third portion 28 is greater than the surface area of the concave B-side 16 of the first portion 24.

Referring still to FIGS. 4 and 5, in some embodiments, at least a portion of the wall portion 22 slopes outward from the proximal perimeter 48 to the distal perimeter 50, such that the distal perimeter 50 is larger than the proximal perimeter 48. In various embodiments, the first, second, and/or third portions 24, 26, 28 of the wall portion 22 may slope outward from the proximal perimeter 48 to the distal perimeter 50. For example, in some embodiments, the first portion 24 of the wall portion 22 slopes outward from the proximal perimeter 48 to the distal perimeter 50. In the embodiment illustrated in FIG. 4, the first, second, and third portions 24, 26, 28 of the wall portion 22 slope outward from the proximal perimeter 48 to the distal perimeter 50. In various embodiments, the first, second, and/or third portions 24, 26, 28 of the wall portion 22 may slope outward from the proximal perimeter 48 to the distal perimeter 50 at an angle between about 25° and about 45° relative to the substantially planar portion 46 of the B-side 16 of the side portion 20 of the pocket portion 18. For example, the first portion 24 of the wall portion 22 may slope outward from the proximal perimeter 48 to the distal perimeter 50 at an angle between about 25° and about 45° relative to the substantially planar portion 46 of the B-side 16 of the side portion 20. In the embodiment illustrated in FIG. 4, the first, second, and third portions 24, 26, 28 slope outward from the proximal perimeter 48 to the distal perimeter 50 at an angle between about 25° and about 45° relative to the substantially planar portion 46 of the B-side 16 of the side portion 20. In some embodiments, the first, second, and/or third portions 24, 26, 28 of the wall portion 22 may slope outward from the proximal perimeter 48 to the distal perimeter 50 at an angle of about 35° relative to the substantially planar portion 46 of the B-side 16 of the side portion 20. In the embodiment illustrated in FIG. 4, each of the first, second, and third portions 24, 26, 28 of the wall portion 22 slope from the proximal perimeter 48 to the distal perimeter 50 at an angle of about 35° relative to the substantially planar portion 46 of the B-side 16 of the side portion 20.

Referring still to FIGS. 4 and 5, in various embodiments, a protrusion 54 may extend outward from the B-side 16 of the side portion 20 of the pocket portion 18 of the door trim panel 12. In some embodiments, at least a portion of the protrusion 54 is vehicle-elevationally aligned with the first portion 24 of the wall portion 22. In some embodiments, at least a portion of the protrusion 54 is vehicle-elevationally lower than at least a portion of the first portion 24 of the wall portion 22. In some embodiments, the protrusion 54 may be positioned vehicle-forward of the first portion 24 of the wall portion 22. In the embodiment illustrated in FIGS. 4 and 5, the protrusion 54 is positioned on the side portion 20, such that a portion of the protrusion 54 is vehicle-elevationally aligned with the first portion 24 of the wall portion 22, a portion of the protrusion 54 is vehicle-elevationally lower than at least a portion of the first portion 24 of the wall portion 22, and the protrusion 54 is positioned vehicle-forward of the first portion 24 of the wall portion 22. In the embodiment illustrated in FIGS. 4 and 5, the protrusion 54 includes a central protuberance 56, and a plurality of fins 58 that extend outward from the central protuberance 56. As illustrated, the plurality of fins 58 extend radially outward from the central protuberance 56. A variety of types of protrusions 54 are contemplated.

Referring now to FIGS. 4 and 5, in some embodiments, various portions of the pocket portion 18 may have varying thicknesses. In other words, the shortest distance between the B-side 16 of the pocket portion 18 and the A-side 14 of the pocket portion 18 at a first point on the pocket portion 18 may be different than that of a second point. In various embodiments, thicknesses of the first, second, and/or third portions 24, 26, 28 of the wall portion 22 are less than the thickness of the side portion 20 that is adjacent to the first, second, and/or third portions 24, 26, 28 of the wall portion 22. In the embodiment illustrated in FIGS. 4 and 5, the thicknesses of each of the first, second, and third portions 24, 26, 28 of the wall portion 22 are less than the thickness of the pocket portion 18 adjacent to the first, second, and third portions 24, 26, 28 of the wall portion 22. Further, the thicknesses of the first, second, and third portions 24, 26, 28 of the wall portion 22 are less than the thickness of the portion of the side portion 20 that includes the substantially planar portion 46 of the B-side 16.

In various embodiments, the thicknesses of the first, second, and/or third portions 24, 26, 28 of the wall portion 22 may be less than about 2 mm. In some embodiments, the thickness of the side portion 20 adjacent to the first portion 24 of the wall portion 22 and/or the thickness of the portion of the side portion 20 that includes the substantially planar portion 46 of the B-side 16 may be greater than about 2 mm. In some embodiments, the thicknesses of the first, second, and/or third portions 24, 26, 28 of the wall portion 22 may be about 1.75 mm. In some embodiments, the thickness of the side portion 20 adjacent to the first, second, and/or third portions 24, 26, 28 of the wall portion 22 may be about 2.25 mm.

The present disclosure may provide a variety of advantages. First, the B-side 16 of the first portion 24 of the wall portion 22 being concave may desirably guide deformation of the door trim panel 12 upon sufficient application of force to the door 34 in a vehicle-laterally-inboard direction. Second, the first, second, and/or third portions 24, 26, 28 of the wall portion 22 of the pocket portion 18 of the door trim panel 12 having relatively smaller thicknesses than the side portion 20 of the pocket portion 18 may desirably guide deformation of the door trim panel 12 upon application of a sufficient force to the door 34 in a vehicle-laterally-inboard direction. Third, the protrusion 54 extending outward from the B-side 16 of the side portion 20 of the pocket portion 18 of the door trim panel 12 may desirably guide deformation of the door trim panel 12 upon application of a sufficient force to the door 34 in the vehicle-laterally-inboard direction. Fourth, the shape and/or positions of the first, second, and/or third portions 24, 26, 28 of the wall portion 22 of the pocket portion 18 of the door trim panel 12, as well as the shape and/or position of the protrusion 54, may desirably correspond with portions of a pelvis of an occupant seated within the vehicle interior 30. For example, as illustrated in FIG. 4, the shape and positions of the first, second, and/or third portions 24, 26, 28 of the wall portion 22, and the protrusion 54 desirably correspond with an acetabulum 60 and an iliac 62 of the occupant.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door trim panel having a vehicle interior-facing A-side and a vehicle door structure-facing B-side, the vehicle door trim panel comprising:
   a pocket portion that includes a side portion and a wall portion that surrounds and extends outward from the pocket portion, the wall portion having a first portion, wherein the B-side of the first portion of the wall portion is concave and faces generally vehicle-downward, and wherein a thickness of the first portion of the wall portion is less than a thickness of the pocket portion adjacent to the first portion of the wall portion, and further wherein the A-side of the pocket portion defines a storage pocket for receiving items therein.

2. The vehicle door trim panel of claim 1, wherein the thickness of the first portion of the wall portion is less than 2 mm.

3. The vehicle door trim panel of claim 2, wherein the thickness of the side portion adjacent to the first portion of the wall portion is greater than 2 mm.

4. The vehicle door trim panel of claim 3, wherein the thickness of the first portion of the wall portion is about 1.75 mm.

5. The vehicle door trim panel of claim 4, wherein the thickness of the side portion adjacent to the first portion of the wall portion is about 2.25 mm.

6. The vehicle door trim panel of claim 1, further comprising:
   a protrusion that extends outward from the B-side of the side portion, wherein at least a portion of the protrusion is at least one of vehicle-elevationally aligned with and vehicle-elevationally lower than at least a portion of the first portion of the wall portion.

7. The vehicle door trim panel of claim 6, wherein the protrusion comprises:
   a central protuberance; and
   a plurality of fins extending radially outward from the central protuberance.

8. The vehicle door trim panel of claim 1, wherein at least a portion of the B-side of the first portion of the wall portion is partially-cylindrical.

9. The vehicle door trim panel of claim 1, wherein the wall portion extends from a proximal perimeter, that is adjacent to the side portion, to a distal perimeter, that is distal from the side portion, wherein at least a portion of the wall portion slopes outward from the proximal perimeter to the distal perimeter, such that the distal perimeter is larger than the proximal perimeter.

10. The vehicle door trim panel of claim 9, wherein the first portion of the wall portion slopes outward from the proximal perimeter to the distal perimeter.

11. The vehicle door trim panel of claim 10, wherein the first portion slopes outward from the proximal perimeter to the distal perimeter at an angle between about 25 degrees and about 45 degrees relative to a substantially planar portion of the B-side of the side portion, wherein the substantially planar portion of the B-side of the side portion comprises a majority of the B-side of the side portion.

12. The vehicle door trim panel of claim 11, wherein the first portion slopes outward from the proximal perimeter to the distal perimeter at an angle of about 35 degrees relative to the substantially planar portion of the B-side of the side portion.

13. A vehicle door trim panel having a vehicle interior-facing A-side and a vehicle door structure-facing B-side, the vehicle door trim panel comprising:
   a pocket portion that includes a side portion and a wall portion that surrounds and extends outward from the pocket portion, the wall portion having a first portion, wherein the B-side of the first portion of the wall portion is concave and faces generally vehicle-downward; and
   a protrusion that extends outward from the B-side of the side portion, wherein the protrusion is positioned vehicle-forward of the first portion of the wall portion, and at least a portion of the protrusion is at least one of vehicle-elevationally aligned with at least a portion of the first portion of the wall portion and vehicle-elevationally lower than at least a portion of the first portion of the wall portion.

14. The vehicle door trim panel of claim 13, wherein the protrusion comprises:
   a central protuberance; and
   a plurality of fins extending radially outward from the central protuberance.

15. The vehicle door trim panel of claim 13, wherein a thickness of the first portion of the wall portion is less than a thickness of the pocket portion adjacent to the first portion of the wall portion.

16. The vehicle door trim panel of claim 13, wherein the A-side of the pocket portion defines a storage pocket for receiving items therein.

17. A vehicle door trim panel having a vehicle interior-facing A-side and a vehicle door structure-facing B-side, the vehicle door trim panel comprising:
   a pocket portion that includes a side portion and a wall portion that surrounds and extends outward from the side portion, the wall portion having a first portion, wherein the B-side of the first portion of the wall portion is concave and faces generally vehicle-downward, a second portion that is adjacent to and positioned vehicle-rearward of the first portion, and a third portion that is adjacent to and extends vehicle-forward and vehicle-upward from the second portion, and wherein the A-side of the pocket portion defines a storage pocket for receiving items therein.

18. The vehicle door trim panel of claim 17, wherein thicknesses of the first, second, and third portions of the wall portion are less than a thickness of the pocket portion adjacent to the first, second, and third portions of the wall portion.

19. The vehicle door trim panel of claim 17, wherein the B-side of the third portion is substantially planar and the surface area of the B-side of the third portion is greater than the surface area of the concave B-side of the first portion.

20. The vehicle door trim panel of claim 17, further comprising:

a protrusion that extends outward from the B-side of the side portion, wherein the protrusion is positioned vehicle-forward of the first portion of the wall portion, and at least a portion of the protrusion is at least one of vehicle-elevationally aligned with at least a portion of the first portion of the wall portion and vehicle-elevationally lower than at least a portion of the first portion of the wall portion.

\* \* \* \* \*